March 26, 1935.  C. FISCHER  1,995,420
FLEXIBLE SHAFTING
Filed Aug. 25, 1933
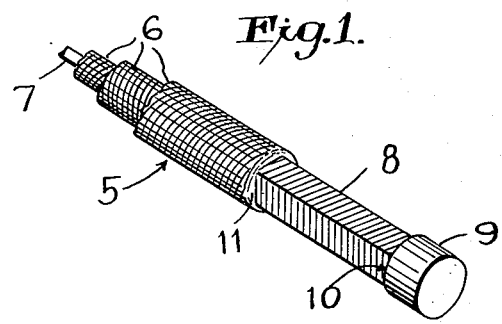
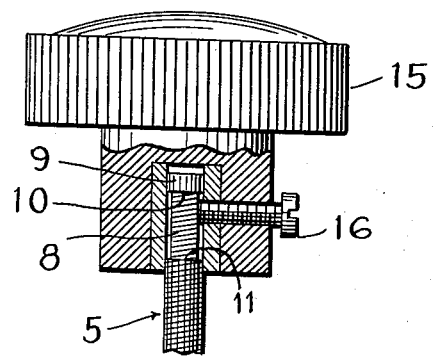
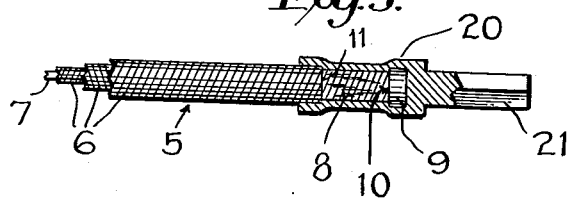
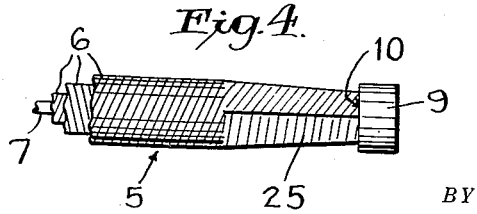
INVENTOR
Charles Fischer
BY Robert J. Pritchard
ATTORNEY Patented Mar. 26, 1935

1,995,420

UNITED STATES PATENT OFFICE 1,995,420

FLEXIBLE SHAFTING

Charles Fischer, New York, N. Y.

Application August 25, 1933, Serial No. 686,680

1 Claim. (Cl. 64—30)

The invention relates to flexible shafting of the type formed by coiling together a plurality of strands of wire closely wound about a core. The invention is particularly directed to the terminal ends of such flexible shafting so as to provide a convenient means of attachment to a driving or driven member.

It is well known in the art to swage the ends of flexible shafting of the type described into polygonal form to make said ends rigid and permit of their engagement with a driving or driven member. However there are serious faults with constructions of this nature, particularly where the flexible shafting is secured to the driving or driven member by a set screw. A sharp pull will disengage the driving or driven member from the flexible shafting. The set screw impinging on the flattened faces of the terminal ends will cause the ends to ravel and after the set screw has been tightened a few times it will not hold.

The principal object of the present invention is to overcome the foregoing difficulty. A further object is the provision of a terminal particularly applicable to the extremity of the flexible shafting.

How these objects are brought about will be explained in the following specification.

Referring to the drawing forming a part thereof:

Fig. 1 is a perspective view showing one of the terminal ends of a flexible shafting embodying the invention;

Fig. 2 is a fragmentary detail view, partly in section and partly in elevation, illustrating the flexible shafting applied to a driving member;

Fig. 3 is a view partly in elevation and partly in section showing a terminal attached to the flexible shafting which may be applicable to either a driving or a driven member; and Fig. 4 is an elevation of an alternate construction.

Referring again to said drawing, and particularly to Fig. 1, the reference numeral 5 designates the flexible shafting. As heretofore mentioned this shafting comprises a plurality of strands of wire 6 closely wound about a core 7.

The outer ends or extremities 9 of the multicoil shafting are brazed so as to seal the ends and positively prevent raveling. A portion 8 of the shafting adjacent the ends is swaged into polygonal form. The ends 9 also serve the important function of forming a headed enlargement on the ends of the shafting and provide the shoulders 10 between the brazed ends and the swaged portion. A shoulder 11 is also formed between the brazed or reduced portion 8 and the body of the shafting.

Fig. 2 shows the flexible shafting applied to a driving member such as the dial knob 15 of a remote control for an automobile radio. It will be noted the set screw 16 impinges on one of the flats of the polygonal swaged portion 8 of the flexible shafting. The sealed brazed end 9 of the shafting will prevent raveling regardless of the pressure applied to the set screw. If the shafting should be given a sharp pull and tend to slip, the shoulder 10 will positively prevent the flexible shafting from becoming disengaged with the driving member.

Fig. 3 illustrates a terminal or tip 20 secured to the flexible shafting. This terminal may act as either a driving or a driven member and its engaging portion 21 while shown as being square may be of any desired cross section. The terminal or tip 20 before being applied to the flexible shafting has the same internal diameter as the external diameter of the shafting. It is swaged over the extremity of the shafting as shown in Fig. 3 and the shoulders and swaged portion 8 will prevent its displacement by forming a double lock. The shoulders 10 and 11 will prevent displacement from pull or push and the polygonal swaged portion will prevent displacement from torsional strain.

Fig. 4 illustrates an alternate construction in which the swaged portion 25 is tapered toward the head 9 and the brazed enlarged head 9 and shoulder 10 serve the same function as in the other forms.

The embodiment of the invention illustrated and described is to be taken by way of example and all such changes in details of construction and arrangements of parts as would occur to one skilled in the art are to be considered as coming within the spirit of the invention and the scope of the appended claim.

I claim:

A flexible shafting comprising a plurality of strands of wire closely wound about a core, the outer end of said shafting being brazed so as to seal it and prevent raveling, a portion adjacent the outer end being swaged into polygonal shape so as to form shoulders between said brazed portion at the outer end and said swaged portion, and between said swaged portion and the body of the shafting, and a terminal swaged onto the extremity of said shafting so that said shoulders and said swaged portion of said shafting form a double lock and prevent displacement of said terminal from either longitudinal or torsional strains.

CHARLES FISCHER.